US011232423B2

(12) United States Patent
Desai et al.

(10) Patent No.: US 11,232,423 B2
(45) Date of Patent: Jan. 25, 2022

(54) LOCATION-BASED AUTHENTICATION OF TRANSACTIONS CONDUCTED USING MOBILE DEVICES

(71) Applicant: Payfone, Inc., New York, NY (US)

(72) Inventors: Rodger R. Desai, New York, NY (US); Eric Woodward, Scottsdale, AZ (US)

(73) Assignee: PAYFONE, INC., New York, NY (US)

( * ) Notice: Subject to any disclaimer, the term of this patent is extended or adjusted under 35 U.S.C. 154(b) by 33 days.

(21) Appl. No.: 16/393,461

(22) Filed: Apr. 24, 2019

(65) Prior Publication Data
US 2019/0251534 A1 Aug. 15, 2019

Related U.S. Application Data

(63) Continuation of application No. 14/935,327, filed on Nov. 6, 2015, now Pat. No. 10,304,042.
(Continued)

(51) Int. Cl.
*G06Q 20/20* (2012.01)
*H04W 12/06* (2021.01)
*G06Q 20/32* (2012.01)
*G06Q 20/40* (2012.01)
*H04W 4/80* (2018.01)
(Continued)

(52) U.S. Cl.
CPC ....... *G06Q 20/202* (2013.01); *G06Q 20/3224* (2013.01); *G06Q 20/3227* (2013.01); *G06Q 20/401* (2013.01); *H04W 4/02* (2013.01); *H04W 4/029* (2018.02); *H04W 4/80* (2018.02); *H04W 12/06* (2013.01); *H04W 12/63* (2021.01)

(58) Field of Classification Search
CPC ............ G06Q 20/202; G06Q 20/3224; G06Q 20/3227; H04W 4/80
USPC .................. 705/21, 16, 44, 67, 72, 26.1, 41; 235/375
See application file for complete search history.

(56) References Cited

U.S. PATENT DOCUMENTS 5,727,163 A 3/1998 Bezos
6,012,144 A 1/2000 Pickett
(Continued)

FOREIGN PATENT DOCUMENTS

CA 2774713 A1 2/2011
EP 1197928 A2 4/2002
(Continued)

OTHER PUBLICATIONS

Response to Rule 312 Communication, U.S. Appl. No. 12/804,438, dated Nov. 8, 2013, 8 pages.
(Continued)

*Primary Examiner* — Vanel Frenel
(74) *Attorney, Agent, or Firm* — Berkeley Law & Technology Group, LLP

(57) ABSTRACT

A transaction authentication system authenticates a transaction by determining whether a mobile device and POS device involved in the transaction are at the same location. A POS registry stores location data for POS devices. A PAN registry stores mobile device IDs corresponding to account numbers. A mobile device ID can be provided from the PAN registry in response to receiving an account number from a POS device. The mobile device ID can then be used to retrieve location information from a home location register maintained by a mobile service provider. The retrieved location data for a POS device and the retrieved location data for a mobile device are compared.

22 Claims, 4 Drawing Sheets

Related U.S. Application Data

(60) Provisional application No. 62/076,201, filed on Nov. 6, 2014.

(51) Int. Cl.
*H04W 4/029* (2018.01)
*H04W 4/02* (2018.01)
*H04W 12/63* (2021.01)

(56) References Cited

U.S. PATENT DOCUMENTS

| | | | |
|---|---|---|---|
| 6,049,712 | A | 4/2000 | Wallinder |
| 6,963,638 | B1 | 11/2005 | Keller |
| 7,720,887 | B2 | 5/2010 | McCormack et al. |
| 8,380,574 | B2 | 2/2013 | Naccache et al. |
| 8,606,640 | B2 | 12/2013 | Brody et al. |
| 9,292,870 | B2 | 3/2016 | Langley et al. |
| 9,679,285 | B2 | 6/2017 | Brody et al. |
| 9,747,596 | B2 | 8/2017 | Brody et al. |
| 9,767,449 | B2 | 9/2017 | Brody et al. |
| 9,906,954 | B2 | 2/2018 | McClement et al. |
| 2001/0037254 | A1 | 11/2001 | Glikman |
| 2002/0052754 | A1 | 5/2002 | Joyce et al. |
| 2002/0143634 | A1 | 10/2002 | Kumar et al. |
| 2003/0212601 | A1 | 11/2003 | Silva et al. |
| 2004/0143545 | A1 | 7/2004 | Kulakowski |
| 2005/0075945 | A1 | 4/2005 | Hodge et al. |
| 2005/0114020 | A1 | 5/2005 | Seto et al. |
| 2005/0144020 | A1 | 6/2005 | Muzaffar et al. |
| 2006/0116105 | A1 | 6/2006 | Frankel et al. |
| 2006/0161646 | A1 | 7/2006 | Chene et al. |
| 2006/0224470 | A1 | 10/2006 | Garcia Ruano et al. |
| 2007/0027803 | A1 | 2/2007 | Brandes et al. |
| 2007/0043664 | A1 | 2/2007 | Wilkes |
| 2007/0055623 | A1 | 3/2007 | Ha et al. |
| 2007/0209051 | A1 | 9/2007 | Xu et al. |
| 2007/0288377 | A1 | 12/2007 | Shaked |
| 2007/0299728 | A1 | 12/2007 | Nemirofsky et al. |
| 2007/0299773 | A1 | 12/2007 | Soderstrom |
| 2008/0103984 | A1 | 5/2008 | Choe et al. |
| 2008/0125117 | A1 | 5/2008 | Jiang |
| 2008/0126261 | A1 | 5/2008 | Lovett |
| 2008/0139171 | A1 | 6/2008 | Bernath |
| 2008/0140548 | A1 | 6/2008 | Csoka |
| 2008/0208743 | A1 | 8/2008 | Arthur et al. |
| 2009/0070691 | A1 | 3/2009 | Jain |
| 2009/0006254 | A1 | 6/2009 | Mumm et al. |
| 2010/0235276 | A1 | 9/2010 | Smith |
| 2010/0261477 | A1 | 10/2010 | Duran et al. |
| 2011/0276478 | A1 | 11/2011 | Hirson et al. |
| 2012/0109826 | A1 | 5/2012 | Kobres |
| 2012/0150669 | A1 | 6/2012 | Langley et al. |
| 2013/0155875 | A1 | 6/2013 | Ayyayamy et al. |
| 2013/0238455 | A1 | 9/2013 | Laracey |
| 2014/0172710 | A1 | 6/2014 | Brody et al. |
| 2016/0048830 | A1 | 2/2016 | Laracey |
| 2017/0323288 | A1 | 11/2017 | Brody et al. |

FOREIGN PATENT DOCUMENTS

| | | |
|---|---|---|
| EP | 2146225 A1 | 1/2010 |
| KR | 20060077541 A | 7/2006 |
| KR | 20070121618 A | 12/2007 |
| KR | 20080003760 A | 1/2008 |
| KR | 20080009671 A | 1/2008 |
| WO | 2004061479 A1 | 7/2004 |
| WO | 2012138236 A1 | 10/2012 |

OTHER PUBLICATIONS

Issue Notification, U.S. Appl. No. 12/804,438, dated Nov. 20, 2013, 1 page.
Application, U.S. Appl. No. 14/098,393, filed Dec. 5, 2013, 108 pages.
Preliminary Amendment, U.S. Appl. No. 14/098,393, filed Dec. 10, 2013, 15 pages.
Notice to File Missing Parts, U.S. Appl. No. 14/098,393, dated Dec. 24, 2013, 2 pages.
Filing Receipt, U.S. Appl. No. 14/098,393, dated Dec. 24, 2013, 3 pages.
Response to Notice to File Missing Parts, U.S. Appl. No. 14/098,393, filed Feb. 24, 2014, 9 pages.
Updated Filing Receipt, U.S. Appl. No. 14/098,393, dated Mar. 7, 2014, 3 pages.
Power of Attorney, U.S. Appl. No. 14/098,393, filed Mar. 31, 2014, 4 pages.
Notice Regarding Power of Attorney, U.S. Appl. No. 14/098,393, dated Apr. 14, 2014, 1 page.
Notice of Publication, U.S. Appl. No. 14/098,393, dated Jun. 19, 2014, 1 page.
Power of Attorney, U.S. Appl. No. 14/098,393, filed Jul. 29, 2014, 4 pages.
Notice of Acceptance of Power of Attorney, U.S. Appl. No. 14/098,393, dated Aug. 5, 2014, 1 page.
Request for Corrected Filing Receipt, U.S. Appl. No. 14/098,393, filed Sep. 4, 2014, 10 pages.
Office Action, U.S. Appl. No. 14/098,393, dated Aug. 23, 2016, 26 pages.
Amendment, U.S. Appl. No. 14/098,393, filed Nov. 23, 2016, 50 pages.
Final Office Action, U.S. Appl. No. 14/098,393, dated Jan. 6, 2017, 22 pages.
Request for Continued Examination and Amendment, U.S. Appl. No. 14/098,393, filed Jun. 6, 2017, 45 pages.
Notice of Allowance, U.S. Appl. No. 14/098,393, dated Jun. 28, 2017, 8 pages.
Issue Fee Payment, U.S. Appl. No. 14/098,393, filed Jul. 21, 2017, 20 pages.
Terminal Disclaimer, U.S. Appl. No. 14/098,393, filed Jul. 21, 2017, 7 pages.
Examiner Response to 312 Amendment, U.S. Appl. No. 14/098,393, filed Jul. 27, 2017, 11 pages.
Response to Rule 312 Communication, U.S. Appl. No. 14/098,393, dated Jul. 31, 2017, 8 pages.
Issue Notification, U.S. Appl. No. 14/098,393, dated Aug. 9, 2017, 1 page.
Application, U.S. Appl. No. 14/098,401, filed Dec. 5, 2013, 108 pages.
Preliminary Amendment, U.S. Appl. No. 14/098,401, filed Dec. 10, 2013, 12 pages.
Filing Receipt and Notice to File Missing Parts, U.S. Appl. No. 14/098,401, dated Dec. 26, 2013, 5 pages.
Declarations, U.S. Appl. No. 14/098,401, filed Feb. 24, 2014, 7 pages.
Response to Notice of Missing Parts, U.S. Appl. No. 14/098,401, filed Feb. 24, 2014, 9 pages.
Filing Receipt, U.S. Appl. No. 14/098,401, dated Mar. 7, 2014, 3 pages.
Power of Attorney, U.S. Appl. No. 14/098,401, filed Mar. 31, 2014, 4 pages.
Notice Regarding Power of Attorney, U.S. Appl. No. 14/098,401, dated Apr. 3, 2014, 1 page.
Notice of Publication, U.S. Appl. No. 14/098,401, dated Jun. 19, 2014, 1 page.
Power of Attorney, U.S. Appl. No. 14/098,401, filed Jul. 29, 2014, 4 pages.
Notice of Acceptance of Power of Attorney, U.S. Appl. No. 14/098,401, dated Jun. 18, 2014, 1 page.
Request for Corrected Filing Receipt, U.S. Appl. No. 14/098,401, filed Apr. 19, 2014, 10 pages.
Office Action, U.S. Appl. No. 14/098,401, dated Aug. 24, 2016, 13 pages.
Amendment, U.S. Appl. No. 14/098,401, filed Nov. 23, 2016, 48 pages.

(56) References Cited

OTHER PUBLICATIONS

RCE and Amendment, U.S. Appl. No. 14/098,401, filed Apr. 5, 2017, 24 pages.
Interview Summary, U.S. Appl. No. 14/098,401, dated Apr. 7, 2017, 4 pages.
Notice of Allowance, U.S. Appl. No. 14/098,401, dated Apr. 28, 2017, 8 pages.
Terminal Disclaimer, U.S. Appl. No. 14/098,401, filed May 11, 2017, 12 pages.
Issue Notification, U.S. Appl. No. 14/098,401, dated May 24, 2017, 1 page.
Application, U.S. Appl. No. 14/267,878, filed May 1, 2014, 118 pages.
Filing Receipt, U.S. Appl. No. 14/267,878, dated May 19, 2014, 4 pages.
Notice to File Missing Parts, U.S. Appl. No. 14/267,878, dated May 19, 2014, 2 pages.
Power of Attorney, U.S. Appl. No. 14/267,878, filed Jul. 29, 2014, 4 pages.
Response to Notice to File Missing Parts, U.S. Appl. No. 14/267,878, filed Aug. 21, 2014, 10 pages.
Notice of Acceptance of Power of Attorney, U.S. Appl. No. 14/267,878, dated Aug. 26, 2014, 1 page.
Filing Receipt, U.S. Appl. No. 14/267,878, dated Aug. 26, 2014, 4 pages.
Notification Concerning Transmittal of Copy of International Preliminary Report on Patentability, International Application No. PCT/US2010/003027, dated Jun. 7, 2012, 1 page.
Notice of Publication, U.S. Appl. No. 17/141,896, dated Jul. 1, 2021, 1 page.
Request for Corrected Filing Receipt, U.S. Appl. No. 14/267,878, dated Apr. 19, 2014, 11 pages.
Notice of Publication, U.S. Appl. No. 14/267,878, dated Dec. 4, 2014, 1 page.
Restriction Requirement, U.S. Appl. No. 14/267,878, dated Dec. 21, 2016, 6 pages.
Amendment, U.S. Appl. No. 14/267,878, filed Feb. 21, 2017, 10 pages.
Office Action, U.S. Appl. No. 14/267,878, dated Mar. 8, 2017, 31 pages.
Amendment, U.S. Appl. No. 14/267,878, filed Jun. 8, 2017, 32 pages.
Notice of Allowance, U.S. Appl. No. 14/267,878, dated Jul. 6, 2017, 20 pages.
Issue Fee Payment, U.S. Appl. No. 14/267,878, filed Jul. 21, 2017, 17 pages.
Response to Rule 312 Communication, U.S. Appl. No. 14/267,878, dated Aug. 17, 2017, 10 pages.
Filing Receipt, U.S. Appl. No. 14/267,878, dated Aug. 23, 2017, 4 pages.
Issue Notification, U.S. Appl. No. 14/267,878, dated Aug. 30, 2017, 1 page.
Application, U.S. Appl. No. 15/657,093, filed Jul. 21, 2017, 129 pages.
Filing Receipt, U.S. Appl. No. 15/657,093, dated Aug. 3, 2017, 4 pages.
Notice of Publication, U.S. Appl. No. 15/657,093, dated Nov. 9, 2017, 1 page.
Office Action, U.S. Appl. No. 15/657,093, dated Dec. 28, 2018, 27 pages.
Amendment, U.S. Appl. No. 15/657,093, filed May 16, 2019, 19 pages.
Notice of Allowance, U.S. Appl. No. 15/657,093, dated Jun. 12, 2019, 23 pages.
Issue Fee Payment, U.S. Appl. No. 15/657,093, filed Aug. 16, 2019, 4 pages.
Issue Notification, U.S. Appl. No. 15/657,093, dated Sep. 11, 2019, 1 page.
Application, U.S. Appl. No. 16/543,358, filed Aug. 16, 2019, 131 pages.

Filing Receipt, U.S. Appl. No. 16/543,358, dated Aug. 28, 2019, 5 pages.
Notice of Publication, U.S. Appl. No. 16/543,358, dated Dec. 5, 2019, 1 page.
Application, U.S. Appl. No. 16/143,205, filed Sep. 26, 2018, 128 pages.
Filing Receipt, U.S. Appl. No. 16/143,205, dated Oct. 26, 2018, 4 pages.
Request for Corrected Filing Receipt, U.S. Appl. No. 16/143,205, filed Nov. 2, 2018, 14 pages.
Filing Receipt, U.S. Appl. No. 16/143,205, ddated Nov. 7, 2018, 4 pages.
Notice of Publication, U.S. Appl. No. 16/143,205, dated Feb. 14, 2019, 1 page.
Office Action, U.S. Appl. No. 16/143,205, dated Apr. 2, 2020, 40 pages.
Amendment, U.S. Appl. No. 16/143,205, filed Jul. 2, 2020, 14 pages.
Notice of Allowance, U.S. Appl. No. 16/143,205, dated Oct. 7, 2020, 28 pages.
Notice to File Corrected Application Papers, U.S. Appl. No. 16/143,205, dated Nov. 16, 2020, 4 pages.
Issue Fee Payment and Amendment, U.S. Appl. No. 16/143,205, filed Jan. 5, 2021, 17 pages.
Filing Receipt, U.S. Appl. No. 16/143,205, dated Jan. 13, 2021, 5 pages.
Response to Rule 312 Communication, U.S. Appl. No. 16/143,205, dated Mar. 4, 2021, 6 pages.
Issue Notification, U.S. Appl. No. 16/143,205, dated Mar. 10, 2021, 1 page.
Application, U.S. Appl. No. 17/141,896, filed Jan. 5, 2021, 114 pages.
Notice to File Missing Parts, U.S. Appl. No. 17/141,896, dated Jan. 21, 2021, 7 pages.
Response to Notice of Missing Parts, U.S. Appl. No. 17/141,896, filed Mar. 22, 2021, 12 pages.
Preliminary Amendment, U.S. Appl. No. 17/141,896, filed Mar. 24, 2021, 9 pages.
Filing Receipt, U.S. Appl. No. 17/141,896, dated Mar. 25, 2021, 5 pages.
Application, International Application No. PCT/US2010/002043, filed Jul. 20, 2010, 76 pages.
PCT Request, International Application No. PCT/US2010/002043, filed Jul. 20, 2010, 4 pages.
Communication re Article 27(3), International Application No. PCT/US2010/002043, dated Aug. 10, 2010, 1 page.
Notification Concerning Payment of Prescribed Fees, International Application No. PCT/US2010/002043, dated Aug. 10, 2010, 2 pages.
Notification of the International Application No. and Filing Date, International Application No. PCT/US201 0/002043, dated Aug. 10, 2010, 1 page.
International Application Status Report, International Application No. PCT/US2010/002043, dated Aug. 12, 2010, 2 pages.
Certified Copy of Priority Document, International Application No. PCT/US2010/002043, filed Aug. 12, 2010, 111 pages.
Certified Copy of Priority Document, International Application No. PCT/US2010/002043, filed Aug. 12, 2010, 99 pages.
Notification of Receipt of Search Copy, International Application No. PCT/US2010/002043, dated Aug. 18, 2010, 1 page.
Invitation to Correct Priority Claim from the International Bureau, International Application No. PCT/US2010/002043, dated Aug. 30, 2010, 3 pages.
Carr, "Mobile Payment Systems and Services, an Introduction", 2007, IDRBT, Hyberabad, 12 pages.
Authors et al., "Method and Apparatus for Mobile Identity Authentication," http://ip.com/IPCOM/000194545, Mar. 29, 2010, 71 pages.
Karnouskos, Stamatis—"Mobile Payment: A Journey Through Existing Procedures and Standardization Initiatives", IEEE Communications Surveys, The Electronic Magazine of Original Peer-Reviewed Survey Articles, Fourth Quarter 2004, vol. 6, No. 4, http://www.comsoc.org/pubs/surveys, 26 pages.

(56) References Cited

OTHER PUBLICATIONS

Petrova, "Mobile Payment: Towards a Customer-Centric Model", Sep. 2008, Auckland University of Technology, Auckland, New Zealand, 12 pages.
Rahimian, "MPaySmart: A Customer Centric Approach in Offering Efficient Mobile Payment Services", 2008 IEEE Asia-Pacific Services Computing Conference, Dec. 9-12, 2008, Department of Computer Engineering, Sharif University of Technology, Tehran, Iran, 6 pages.
Schwartz, "Standards Watch: Simpay Reaching an Untapped Market", Dec. 1, 2004, B/OSS: Billing & OSS World, http://www.vpico.com/articlemanager/printerfirendly.aspx?article+158968, 3 pages.
Soghoian, "Merx: Secure and Privacy Preserving Delegated Payments", Apr. 2009, Berkman Center for Internet and Society, Harvard University, USA, 23 pages.
"USSD Notifications: Get Real-Time Feedback From Your Customers, Without The Need For An Internet Connection", http://www.txtnation.com/mobile-messaging/ussd notifications/, accessed Aug. 15, 2017, 5 pages.
Application, U.S. Appl. No. 12/583,151, filed Aug. 14, 2009, 100 pages.
Filing Receipt, U.S. Appl. No. 12/583,151, dated Sep. 2, 2009, 3 pages.
Notice to File Missing Parts, U.S. Appl. No. 12/583,151, dated Sep. 2, 2009, 2 pages.
Response to Notice to File Missing Parts, U.S. Appl. No. 12/583,151, filed Nov. 2, 2009, 7 pages.
Updated Filing Receipt, U.S. Appl. No. 12/583,151, dated Nov. 16, 2009, 3 pages.
Request for Corrected Filing Receipt, U.S. Appl. No. 12/583,151, filed Dec. 10, 2009, 4 pages.
Updated Filing Receipt, U.S. Appl. No. 12/583,151, dated Dec. 22, 2009, 3 pages.
Preliminary Amendment, U.S. Appl. No. 12/583,151, filed Jul. 14, 2010, 27 pages.
Office Action, U.S. Appl. No. 12/583,151, dated Jul. 15, 2010, 17 pages.
Rescission of Previous Nonpublication Request, U.S. Appl. No. 12/583,151, filed Jul. 26, 2010, 1 page.
Communication Regarding Rescission of Nonpublication Request, U.S. Appl. No. 12/583,151, dated Aug. 10, 2010, 1 page.
Amendment, U.S. Appl. No. 12/583,151, filed Nov. 15, 2010, 19 pages.
Notice of Publication, U.S. Appl. No. 12/583,151, dated Nov. 18, 2010, 1 page.
Notice of Erroneous Early Release of Patent Application Information, U.S. Appl. No. 12/583,151, dated Nov. 30, 2010, 1 page.
Final Office Action, U.S. Appl. No. 12/583,151, dated Jan. 28, 2011, 14 pages.
Amendment, U.S. Appl. No. 12/583,151, filed Mar. 28, 2011, 23 pages.
Advisory Action, U.S. Appl. No. 12/583,151, dated Apr. 15, 2011, 3 pages.
Amendment, U.S. Appl. No. 12/583,151, filed Apr. 28, 2011, 19 pages.
Advisory Action, U.S. Appl. No. 12/583,151, dated May 31, 2011, 3 pages.
Notice of Appeal, U.S. Appl. No. 12/583,151, filed May 27, 2011, 5 pages.
RCE and Amendment, U.S. Appl. No. 12/583,151, filed Jul. 27, 2011, 17 pages.
Office Action, U.S. Appl. No. 12/583,151, dated May 29, 2014, 23 pages.
Notice of Abandonment, U.S. Appl. No. 12/583,151, dated Dec. 5, 2014, 2 pages.
Application, U.S. Appl. No. 12/804,438, filed Jul. 20, 2010, 107 pages.
Filing Receipt, U.S. Appl. No. 12/804,438, dated Aug. 30, 2010, 3 pages.
Notice to File Missing Parts, U.S. Appl. No. 12/804,438, dated Aug. 30, 2010, 2 pages.
Response to Notice to File Missing Parts, U.S. Appl. No. 12/804,438, filed Oct. 25, 2010, 9 pages.
Updated Filing Receipt, U.S. Appl. No. 12/804,438, dated Nov. 12, 2010, 3 pages.
Notice of Publication, U.S. Appl. No. 12/804,438, dated Feb. 24, 2011, 1 page.
Office Action, U.S. Appl. No. 12/804,438, dated Sep. 22, 2011, 14 pages.
Amendment, U.S. Appl. No. 12/804,438, filed Mar. 22, 2012, 24 pages.
Final Office Action, U.S. Appl. No. 12/804,438, dated Jun. 11, 2012, 16 pages.
Amendment, U.S. Appl. No. 12/804,438, filed Aug. 13, 2012, 26 pages.
Advisory Action, U.S. Appl. No. 12/804,438, dated Aug. 29, 2012, 3 pages.
Notice of Appeal, U.S. Appl. No. 12/804,438, filed Sep. 11, 2012, 6 pages.
Appeal Brief, U.S. Appl. No. 12/804,438, filed Nov. 13, 2012, 39 pages.
Examiner's Answer, U.S. Appl. No. 12/804,438, dated Feb. 21, 2013, 11 pages.
PTAB Docketing Notice, U.S. Appl. No. 12/804,438, dated May 31, 2013, 2 pages.
RCE and Amendment, U.S. Appl. No. 12/804,438, filed Sep. 10, 2013, 18 pages.
Order Dismissing Appeal, U.S. Appl. No. 12/804,438, dated Sep. 16, 2013, 2 pages.
Notice of Allowance, U.S. Appl. No. 12/804,438, dated Oct. 9, 2013, 7 pages.
Issue Fee Payment and Amendment After Allowance, U.S. Appl. No. 12/804,438, filed Oct. 29, 2013, 15 pages.
Notification of Receipt of Record Copy, International Application No. PCT/US2010/002043, dated Aug. 30, 2010, 1 page.
Notification Concerning Submission of Priority Document, International Application No. PCT/US2010/002043, dated Aug. 31, 2010, 1 page.
Invitation to Correct Priority Claim from the Receiving Office, International Application No. PCT/US2010/002043, dated Sep. 8, 2010, 3 pages.
Communication re form PCT/IB/316, International Application No. PCT/US2010/002043, dated Sep. 16, 2010, 1 page.
Notification Relating to Priority Claim, International Application No. PCT/US2010/002043, dated Sep. 21, 2010, 2 pages.
Notification Concerning Submission of Priority Document, International Application No. PCT/US2010/002043, dated Sep. 22, 2010, 1 page.
Communication re Request to Correct Priority Claim, International Application No. PCT/US2010/002043, filed Oct. 1, 2010, 3 pages.
Request to Correct Priority Claim, International Application No. PCT/US2010/002043, filed Oct. 1, 2010, 5 pages.
PCT Request Substitute Sheet, International Application No. PCT/US2010/002043, filed Oct. 1, 2010, 1 pages.
Notification Relating to Priority Claim, International Application No. PCT/US2010/002043, dated Oct. 7, 2010, 2 pages.
International Search Report, International Application No. PCT/US2010/002043, dated Jan. 26, 2011, 3 pages.
Written Opinion of the International Searching Authority, International Application No. PCT/US2010/002043, dated Jan. 26, 2011, 5 pages.
Publication, International Application No. PCT/US2010/002043, dated Feb. 17, 2010, 77 pages.
Notification Concerning Availability of the Publication of the International Application, International Application No. PCT/US2010/002043, dated Feb. 17, 2011, 1 page.
First Notice Informing the Applicant of the Communication of the International Application, International Application No. PCT/US2010/002043, dated Mar. 17, 2011, 1 page.
Notification Concerning Availability of the Publication of the International Application, International Application No. PCT/US2010/002043, dated Apr. 7, 2011, 1 page.

(56) References Cited

OTHER PUBLICATIONS

Second Notice Informing the Applicant of the Communication of the International Application, International Application No. PCT/US2010/002043, dated Dec. 15, 2011, 1 page.
International Preliminary Report on Patentability, International Application No. PCT/US2010/002043, dated Feb. 14, 2012, 6 pages.
Notification Concerning Transmittal of Copy of International Preliminary Report on Patentability, International Application No. PCT/US2010/002043, dated Feb. 23, 2012, 1 page.
Certified Copy of Priority Document, International Application No. PCT/US2010/002043, filed May 5, 2015, 107 pages.
Examination Request, Canadian Application No. 2774713, filed Jul. 14, 2015, 1 pages.
Office Action, Canadian Application No. 2774713, dated Jul. 18, 2016, 4 pages.
Notice of Abandonment, Canadian Application No. 2774713, dated Mar. 1, 2017, 1 page.
Entry into the European Phase, European Patent Application No. 10808435.1, dated Dec. 21, 2011, 1 page.
Application, European Patent Application No. 10808435.1, filed Mar. 14, 2012, 68 pages.
Rule 161/162 Communication, European Patent Application No. 10808435.1, dated Apr. 16, 2012, 2 pages.
Notice of Publication, European Patent Application No. 10808435.1, dated May 23, 2012, 1 page.
Search Report Inquiry, European Patent Application No. 10808435.1, filed Aug. 25, 2014, 1 page.
Response to Search Report Inquiry, European Patent Application No. 10808435.1, dated Aug. 29, 2014, 1 page.
Extended European Search Report, European Patent Application No. 10808435.1, dated Feb. 27, 2015, 7 pages.
Request to Withdraw Application, European Patent Application No. 10808435.1, filed Sep. 15, 2015, 3 pages.
Withdrawal Confirmation, European Patent Application No. 10808435.1, dated Sep. 22, 2015, 1 page.
Application, International Application No. PCT/US2010/003027, filed Nov. 23, 2010, 54 pages.
PCT Request, International Application No. PCT/US2010/003027, filed Nov. 23, 2010, 4 pages.
Communication re Article 27(3), International Application No. PCT/US2010/003027, dated Dec. 3, 2010, 1 page.
Notification of the International Application No. International Application No. PCT/US2010/003027, dated Dec. 3, 2010, 1 page.
Notification Concerning Payment of Prescribed Fees, International Application No. PCT/US2010/003027, dated Dec. 3, 2010, 2 pages.
International Application Status Report, International Application No. PCT/US2010/003027, dated Dec. 5, 2010, 2 pages.
Certified Copy of Priority Document, International Application No. PCT/US2010/003027, filed Dec. 5, 2010, 111 pages.
Notification of Receipt of Record Copy, International Application No. PCT/US2010/003027, dated Dec. 10, 2010, 1 page.
Notification Concerning Submission of Priority Document, International Application No. PCT/US2010/003027, dated Dec. 13, 2010, 1 page.
Notification of Receipt of Search Copy, International Application No. PCT/US2010/003027, dated Dec. 14, 2010, 1 page.
Notification Concerning Availability of the Publication, International Application No. PCT/US2010/003027, dated May 26, 2011, 1 page.
Publication, International Application No. PCT/US2010/003027, dated May 26, 2011, 4 pages.
International Search Report, International Application No. PCT/US2010/003027, dated Jun. 23, 2011, 3 pages.
First Notice Informing the Applicant of the Communication of the International Application, International Application No. PCT/US2010/003027, dated Jun. 23, 2011, 1 page.
Written Opinion of the International Search Authority, International Application No. PCT/US2010/003027, dated Jun. 23, 2011, 4 pages.
Notification Concerning Availability of the Publication, International Application No. PCT/US2010/003027, dated Aug. 18, 2011, 1 page.
Second Notice Informing Application of the Communication of the International Application, International Application No. PCT/US2010/003027, dated Mar. 29, 2012, 1 page.
International Preliminary Report on Patentability, International Application No. PCT/US2010/003027, dated May 30, 2012, 5 pages.

LOCATION-BASED AUTHENTICATION OF TRANSACTIONS CONDUCTED USING MOBILE DEVICES

CROSS REFERENCES TO RELATED APPLICATIONS

This application is a continuation of U.S. Nonprovisional application Ser. No. 14/935,327 entitled "Location-Based Authentication Of Transactions Conducted Using Mobile Devices," filed Nov. 6, 2015, which claims the benefit of U.S. Provisional Application No. 62/076,201 entitled "Location-Based Authentication Of Transactions Conducted Using Mobile Devices," filed Nov. 6, 2014, which is expressly incorporated by reference in its entirety for all purposes as if fully set forth herein.

BACKGROUND OF THE INVENTION

Conducting transactions using mobile devices is becoming increasingly popular. Mobile devices can communicate with a point-of-sale (POS) device or terminal, such as by NFC or other short range signaling, in order to communicate account and other transaction information. A user of the mobile device can thus use one or more accounts (credit, debit or other) without having to carry and present a traditional payment card to a merchant.

Transactions conducted with mobile devices do carry some risk. For example, a fraudster may be able to obtain payment credential information (account number and related data needed for a transaction) and use that information to attempt a transaction with a device that is not the mobile device of the authorized account holder. Banks and other financial institutions processing card transactions may require higher levels of scrutiny to authenticate the user when the transaction is conducted using a mobile device, sometimes leading to transactions being declined (out of an abundance of caution) when there is any uncertainty about the transaction.

Thus, additional forms of authenticating the user can be useful for these types of transactions.

BRIEF SUMMARY OF THE INVENTION

There is provided, in accordance with embodiments of the present invention, a network/system and method for authenticating a transaction by obtaining locations for a mobile device and for a POS device that are being used for the transaction, and comparing the locations to determine whether or not they are the same.

In one embodiment, a method for authenticating a transaction conducted at a point of sale (POS) device with a mobile device comprises: at a POS registry, storing, in association with a POS ID corresponding to each of one or more POS devices, POS location data pertaining to the location of the corresponding POS device; at a PAN registry, storing, in association with an account ID corresponding to each of one or more accounts, a mobile device ID identifying a mobile device for conducting transactions using the corresponding account; receiving, at a transaction authentication system, transaction data for a transaction conducted against a specified account at a specified POS device by a customer, the transaction data comprising a POS identifier for the specified POS device and an account ID for the specified account; with the received transaction data at the transaction authentication system, (1) accessing the POS registry for location data for the specified POS device, and (2) accessing the PAN registry to retrieve a mobile device ID associated with the mobile device; using the retrieved mobile device ID to determine the location data for the specified mobile device, by accessing location information maintained by a mobile service provider; and comparing the accessed location data for the specified POS device and the determined location data for specified mobile device.

A more complete understanding of the present invention may be derived by referring to the detailed description of the invention and to the claims, when considered in connection with the Figures.

DETAILED DESCRIPTION OF THE INVENTION

There are various embodiments and configurations for implementing the present invention. Generally, embodiments provide systems and methods for authenticating a transaction that is conducted using a mobile device at a point-of-sale (POS) terminal, by determining whether the mobile device conducting the transaction is at a location near the POS terminal.

In one embodiment, a transaction authentication system includes a POS registry and a PAN registry. The POS registry maintains location information for a plurality of POS terminals. The PAN registry stores and maintains identifying data (e.g., a SIM card number) for a mobile device used as a payment device. When a transaction is conducted, the transaction authentication system accesses the POS registry to determine the location of the POS terminal used for the transaction, and accesses the PAN registry to look up the SIM card number (and device/phone) associated with the account number being used for the transaction. The looked-up phone number or SIM card number is then used to access location data maintained by a mobile service provider (e.g., an entity that provides mobile service to the mobile device used for the transaction), with the accessed location data relating to the location of the authorized mobile device. In one embodiment, the accessed location data is data at a home location register (HLR) maintained by the mobile service provider.

While embodiments of the invention described herein relate to transactions where a mobile device serves as the presentation instrument (payment card) of a consumer/user, it should be appreciated that the invention is not so limited. For example, transactions in which a consumer is using a traditional payment card (separate from the mobile device) can also be authenticated using location information relating to the POS device at which the transaction is being conducted and location information relating to a mobile device of the consumer. Since mobile devices are usually carried by consumers when away from their home or residence, it is likely that a consumer conducting a transaction with a traditional payment card is likely to have that consumer's mobile device in his/her possession. Accordingly, a consumer who has both a mobile device and a traditional payment card is likely to carry both at the same time, and knowing the location of the mobile device likely reflects the location of the authorized user. Thus, in accordance with embodiments of the invention, the authentication of physical card transactions can consider, among other things, the location of a cardholder's mobile device (in relation to the location of the POS device at which a transaction is being conducted).

Figure 1:
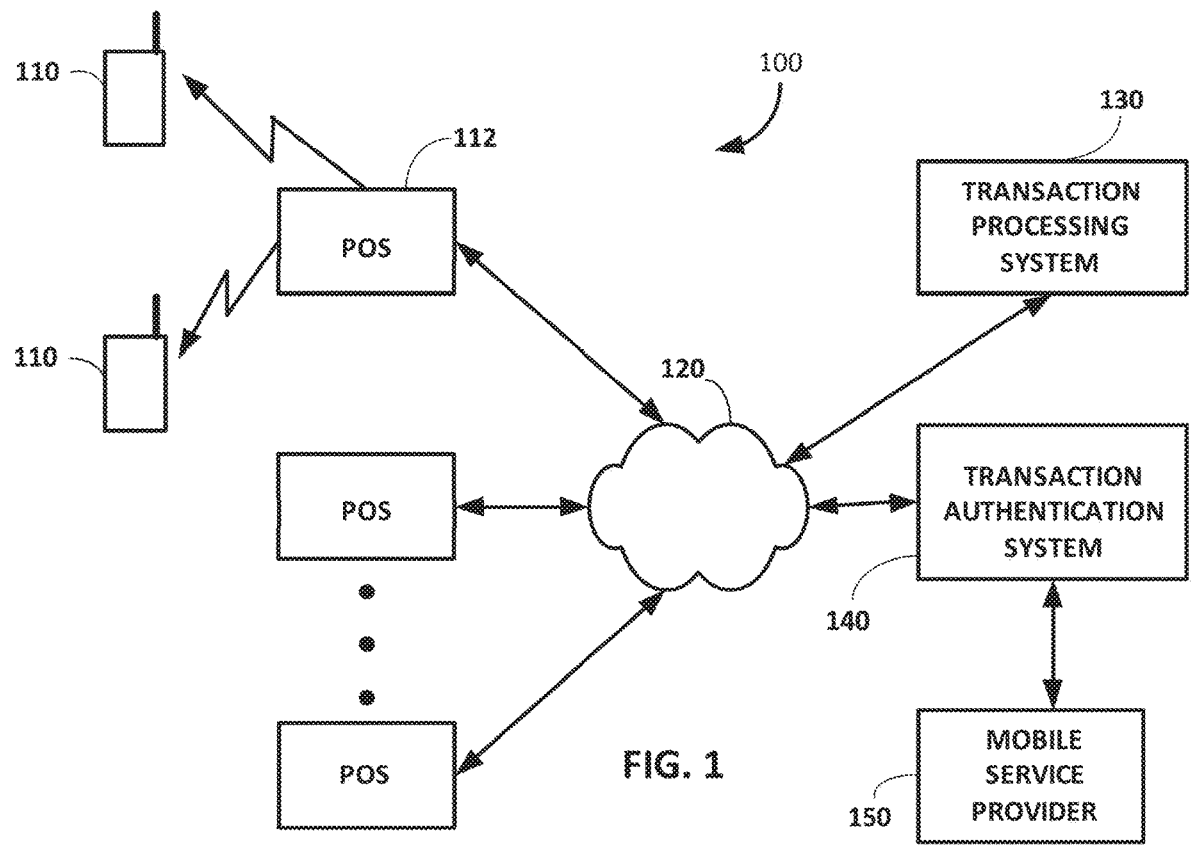
FIG. 1 is a general block diagram showing a network in which transactions are processed, where individual transactions may be conducted by a user with a mobile device.

Referring now to FIG. 1, a network 100 according to one embodiment of the invention is illustrated. The network 100 includes a plurality of mobile devices 110 that communicate with POS devices or terminals 112 for purposes of conducting transactions at the POS devices 112.

The mobile devices 110 each include a smart card chip that enables the payment functionality of the mobile devices. The mobile devices 110 further each include a SIM (subscriber identity module) card that is used by a mobile service provider to track and identify mobile devices. The SIM card stores various data, including data identifying the SIM card (e.g., ICCD), an international mobile subscriber identity (IMSI) number or mobile identification number (MIN) that uniquely identifies the mobile device in which the SIM card is installed, security authentication and ciphering information for communications from the mobile device, mobile subscriber network identification, a list of services that the user of the mobile device has access to, and other data and information known to those skilled in the art. SIM cards are replaceable to reflect any changes in the nature of services provided by the mobile device.

The POS devices 112 are connected to communicate through a payment processing communications network 120 to a transaction processing system 130. The transaction processing system 130 may be in turn connected to communicate with financial institutions (not shown) that maintain accounts against which transactions are conducted. The financial institutions may approve or decline a transaction based on account limits, account balances and other information pertaining to the risk associated with the transaction. In some cases, transactions may be approved or declined by the transaction processing system acting on behalf of the financial institutions.

In accordance with one embodiment of the invention, the transaction processing system 130 may also communicate through network 120 to a transaction authentication system 140, which in turn may be connected for communication with a mobile service provider 150. As will be described shortly, the transaction authentication system 140 may be used by the transaction processing system 130 to authenticate transactions between mobile devices 110 and POS devices 112, using location data associated with the mobile devices and POS devices. The transaction authentication system 140 accesses the mobile service provider 150 in order to determine the location of a mobile device 110 being used to conduct a transaction.

Figure 2:
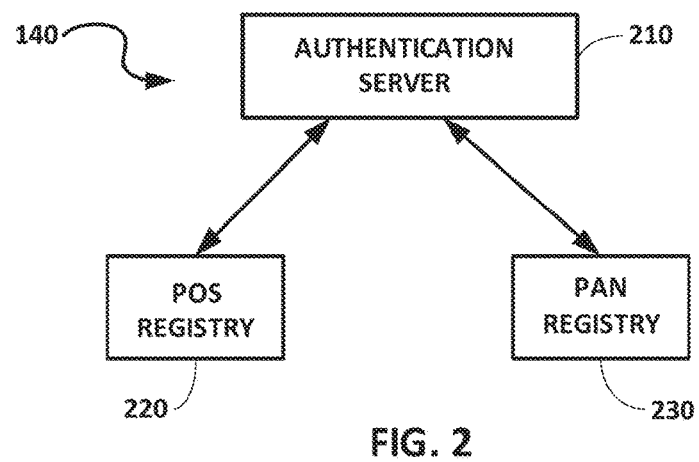
FIG. 2 illustrates in greater detail the transaction authentication system seen in FIG. 1

FIG. 2 illustrates in greater detail the transaction authentication system 140. The system 140 includes an authentication server 210, a POS registry 220 and a PAN registry 230. The POS registry 220 maintains location data for the various POS devices 112 (the POS registry may be implemented at a memory device associated with server 210). The PAN registry 230 maintains account information and associated mobile device ID information (the PAN registry may likewise be implemented at a memory device associated with server 210). The PAN registry 230 thus permits identification of a mobile device in response to receipt of an account number provided with transaction information from a POS device 112. The mobile device ID information provided by the PAN registry 230 may be a telephone number, SIM card identifier (IMSI or MIN), or other mobile device identifying data.

Figure 3:
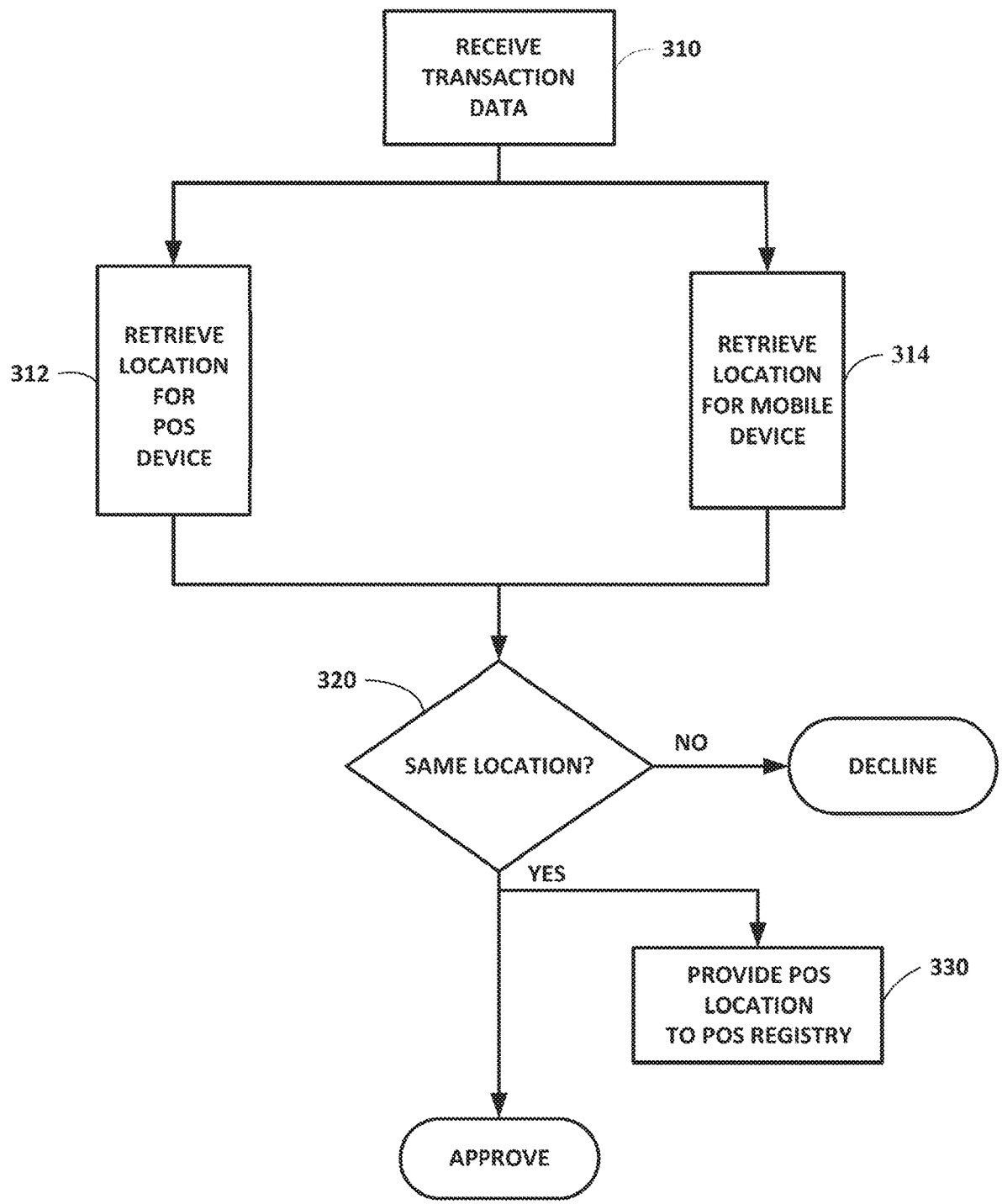
FIG. 3 is a flow diagram illustrating a process for authenticating transactions in accordance with one embodiment of the invention.

FIG. 3 illustrates a process that may be implemented at the transaction processing system 130 and the authentication server 210, for purposes of authenticating a transaction conducted between a mobile device 110 and a POS device 112. At step 310, transaction data is received for a transaction at a POS device 112. The transaction data may be data taken from an authorization request message received at the transaction processing system 310. Such a message typically includes various information concerning a transaction that has been initiated at a POS device 112, including information concerning the account being used (provided in wireless communications between the mobile device 110 and the POS device 112), an identifier for the POS device 112, and various other kinds of information associated with the transaction (transaction amount, card expiration date, a merchant identifier, transaction ID, etc.). On behalf of the financial institution maintaining the account, the transaction processing system 130 may use various information concerning the transaction in order to authenticate the transaction (e.g., to prevent fraud). At step 310, the transaction authentication system 140 receives (e.g., from data in a transaction authorization request) a POS ID for the POS device 112 conducting the transaction and account information (e.g., the account number or PAN) provided by the mobile device 110 to the POS device 112.

At step 312, the server 210 uses the transaction data received at step 310 in order to retrieve location information for the POS device stored in the POS registry 220 (such retrieval based on the POS ID received at step 310).

At step 314, the server 210 uses the transaction data received at step 310 in order to retrieve the mobile device ID stored in the PAN registry 230 (such retrieval based on the account number/ID received at step 310). Further at step 314, the retrieved mobile device ID is provided to the mobile service provider 150 for a real-time location of the mobile device 110 associated with the mobile device ID. In one embodiment, the mobile service provider 150 obtains the real-time location based on information in the home location register (HLR) maintained by the service provider. The HLR is a central database that contains details of each mobile device subscriber that is authorized to use the mobile network of the service provider, including (among other things) the current location of the mobile device, subscription data (services to which the user of the mobile device has subscribed, and cryptograms used in authenticating a mobile device when it initiates communications in a home network or any roaming network. In the described embodiment, the location data within the HLR is retrieved using the mobile device ID (IMSI/MIN) received at step 310. In some embodiments, the location data is retrieved from the HLR using a mobile service provider Signal Transfer Point (STP) or similar network element to rapidly provide the location data to the authentication server 210. Further details concerning the HLR and the location information for a mobile device that it maintains will be provided later.

While the process illustrated in FIG. 3 provides for retrieval of a mobile device ID directly from a provided account number, in some embodiments the authentication system may use an account number to first access account holder personal information (e.g., name, account holder ID, etc.), and then use the personal information to retrieve the mobile device ID stored in association with the account holder personal information.

In some embodiments, real-time location data for mobile devices based on a mobile ID (SIM card number) might be collected (periodically or continuously) from multiple mobile service providers (e.g., their HLRs) and stored at one location for immediate access by the authentication server (e.g., based on look up of mobile ID's at the PAN registry).

At step 320, the authentication server 210 determines whether the mobile device 110 and the POS device 112 are at the same location by comparing the location data retrieved at steps 312 and 314. If they are not, the transaction authentication system 140 determines that the transaction should be declined and communicates such result to the transaction processing system 130. If the server 210 determines that the mobile device 110 and the POS device 112 are in fact at the same location, then the transaction is approved and such result is communicated to the transaction processing system 130.

In some embodiments, the authentication server 210 may also calculate a score representing the likelihood that the POS device and mobile device are at the same location at step 320. For example, the authentication server 210 may evaluate the following factors in calculating such a score:

(1) patterns locations of past approved transactions, and whether a retrieved mobile device location is inconsistent with such patterns; (2) a mobile device location that is known to be used by fraudsters in attempting to conduct fraudulent transactions; (3) history of past fraudulent transactions involving the POS device location, especially when the POS device location reflects that the POS device has frequently moved; and (4) increasing numbers of reported fraudulent transactions involving mobile devices, especially in the location of the POS device or the location of the mobile device being used for the transaction. The preceding factors are only exemplary, and other factors are possible in calculating a score.

It should be noted that there may be several different ways for obtaining location information stored within the POS registry 220. In one embodiment, the location of each POS terminal may be provided in advance by the merchant or other entity operating the POS device. In another embodiment, the location of the POS terminal may be determined and updated in response to approved transactions where the POS device has been found to be at the same location as a mobile device 110. This last mentioned embodiment has particular usefulness when a POS device may change locations, such as would be the case with a POS device used by a merchant that has multiple locations or that travels for sales/transactions at different remote locations. This last mentioned embodiment is illustrated at step 330 of FIG. 3, where the POS location as reflected in a transaction approved at step 320 (and being the same location as a mobile device reflected, e.g., at an HLR maintained by the mobile service provider) is provided to the POS registry.

Figure 4:
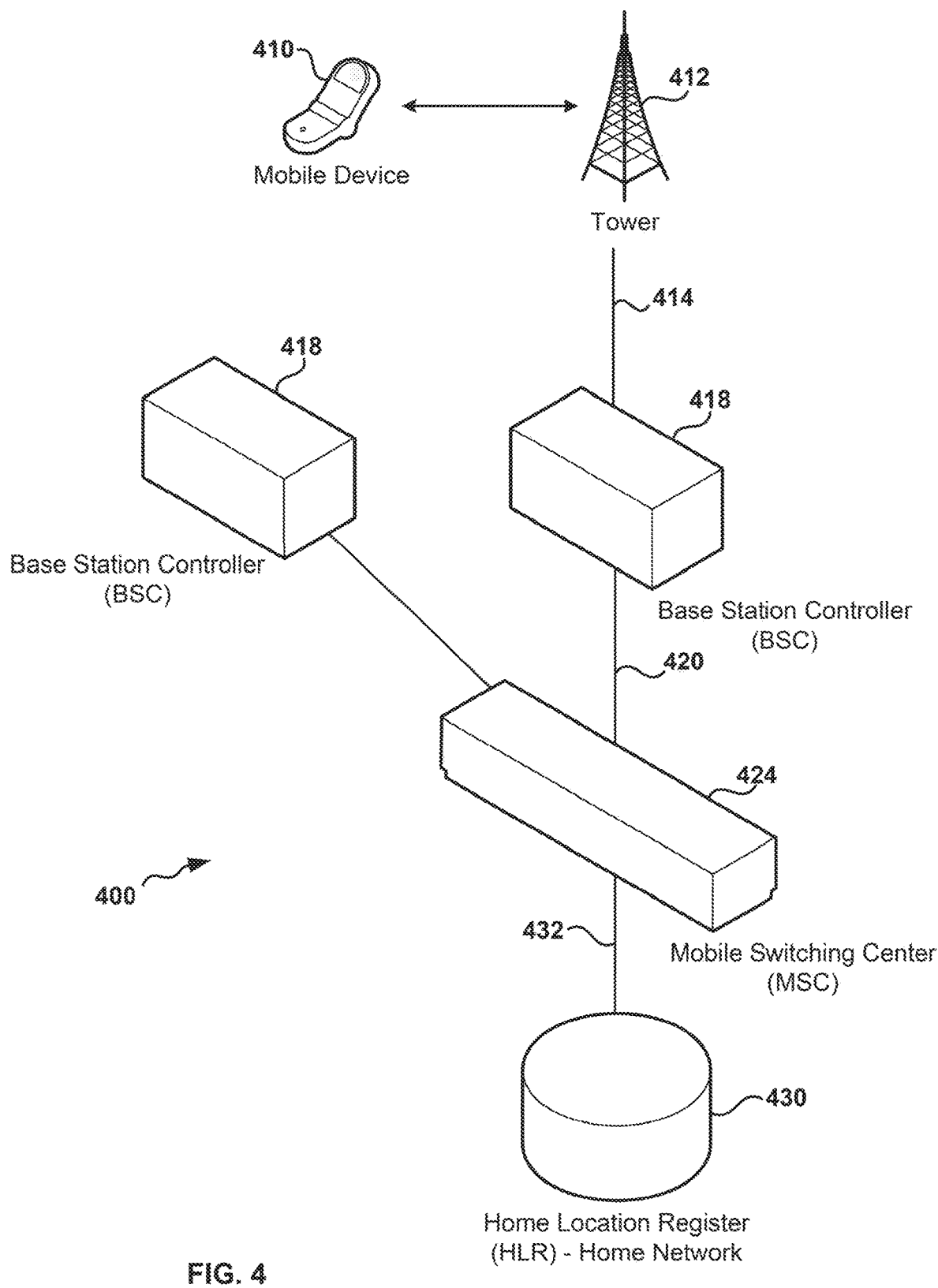
FIG. 4 illustrates a mobile data network in which mobile devices may be used to conduct transactions.

Turning now to FIG. 4, there is generally illustrated a mobile data network 400 having various components or systems that may be used to implement one embodiment of the invention. As seen, a mobile device 410 communicates via bi-directional radio signals with a network tower 412 having a base transceiver station or BTS (not shown) that handles radio communications between the network tower and the mobile device. In some cases, there may be more than one BTS physically located at the tower 412. In most conventional systems, the network tower or BTS is assigned to a cell or particular location area identified by a Location Area Identity (LAI), which thus uniquely identifies each location area in which mobile devices are operating. The network tower 412 (and its BTS) communicate by way of a transmission line 414 with a base station controller (BSC) 418 that handles allocation of radio channels, frequency administration, power and signal measurements from the mobile device, and also may institute handovers from one BTS to another for a device traveling in its coverage area. The BSC also funnels wireless communications via a transmission line 420 to a mobile switching center (MSC) 424, which manages communications with mobile devices in a coverage area for which the MSC and its various BCSs and BTSs are used. As illustrated in FIG. 4, there may be multiple BSCs 418 handling communications for a large number of mobile devices that are operating in the MSC coverage area.

The network 400 also illustrates a home location register (HLR) 430 containing information for all "home" subscribers of the mobile service provider. The HLR 430 is located at a central system (not shown) operated by the mobile service provider. Each service provider in the network 400 would have its own HLR 430. Although only one HLR 430 is illustrated in FIG. 4, it should be appreciated that there are multiple HLRs, each connected (at the central system of its respective mobile service provider) by way of a transmission line 432 to each the mobile switching centers 424 in the network. From the foregoing, it should be appreciated that the network 400 represents a plurality of mobile networks, each mobile network operated by a mobile service provider, each having an HLR 430, and each having multiple MSCs connecting to multiple BSCs and to network towers 412.

As mentioned earlier, each HLR maintains, among other things, the current location of every mobile device for subscribers in the home network with which the HLR is associated. It should be appreciated that, in the general illustration of FIG. 4, the mobile switching center (MSC) 424 could be a switching center within that home network or could be a mobile switching center associated with networks of other mobile service providers (where a subscriber may be roaming). The HLR maintains location information for the mobile device 410 of each of its subscribers, regardless of whether the MSC 424 serving the mobile device is in the home network or in a different provider's network. In most conventional mobile networks, location information stored in the HLR is an identifier for the MSC 424 managing the coverage area where the subscriber's mobile device is located.

Figure 5:
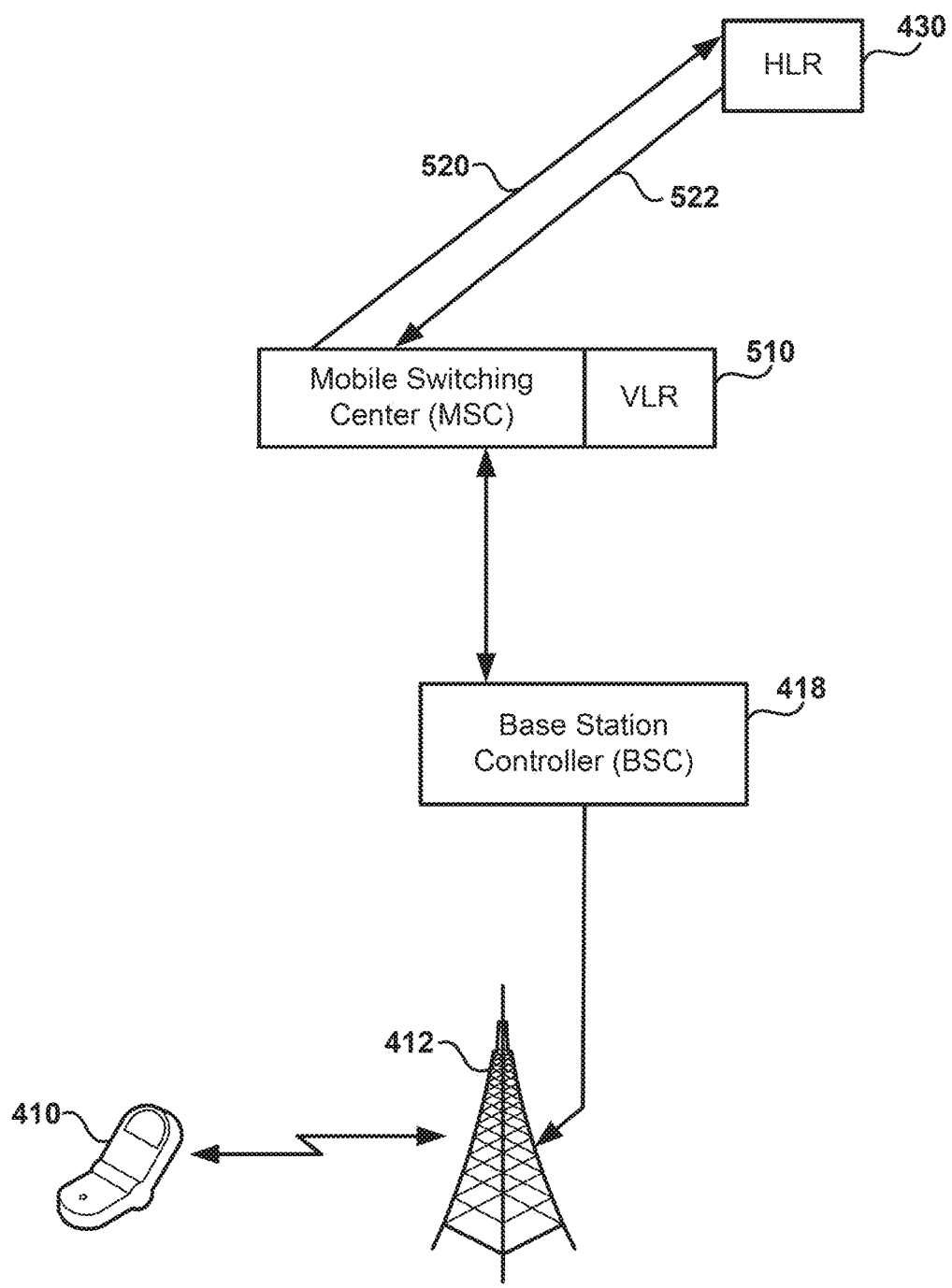
FIG. 5 illustrates communications between an a home location register (HLR) of a home network and a mobile switching center (MSC) having a coverage area that serves a mobile device.

The communications between the HLR 430 associated with a mobile device 410 and an MSC 424 is illustrated in greater detail in FIG. 5. Each MSC 424 has an associated visitor location register (VLR) 510 that maintains information pertaining to each mobile device serviced by that MSC 424. When the mobile device 410 attempts to register with a serving MSC 424 (such as by providing identification in the form of an IMSI or MIN)) by way of a network tower to the BSC 418, the MSC 424 transmits a location update signal 520 the HLR 430, in order to authenticate the mobile device. The HLR 430 (and the central system with which it is associated) authenticates the mobile device and then updates its information to reflect the MSC 424 currently serving the authenticated mobile device 410 (such location information is later utilized by the HLR 430 re-route incoming calls to the serving MSC 424). After the HLR 430 is updated with the serving MSC 424 information, the HLR 430 then transmits subscriber data in the form of a signal 522 to the VLR associated with the serving MSC 424. The use of an HLR to maintain location data and authenticate a mobile device as described above is known to those skilled in the art. Further details concerning the various functions performed by the HLR 430 and the other components of the illustrated networks 400 and 500 (FIGS. 4 and 5)) can be found, for example, in U.S. Pat. No. 6,038,445, "Providing Service Area Dependent Subscriber Data Within A Mobile Telecommunications Network," issued Mar. 14, 2002 Vladimir Alperovich et al, and hereby by incorporated by reference in its entirety.

The MSC 424 and/or its associated VLR 510 also stores more specific location information relating to the mobile device 410 (i.e., more specific that the information maintained at the HLR). For example, the more specific location information maintained at the MSC 424 (and its VLR) may identify the specific BSC 418 (and its network tower 412) through which the mobile device 410 is communicating, in order to properly route communications between the MSC 424 and local area or cell where the mobile device 410 is located. As will be described shortly, such specific location information could be used in some embodiments of the invention.

In one embodiment, location information for a mobile device being used to conduct a transaction (step 314, FIG. 3) is merely the identified MSC 424 and its location. For example, a database may be maintained by the authentication server 210 with data provided by various mobile service providers that defines the geographical area served by each MSC 424. If the geographical area is consistent with the location for a POS device at which a transaction is being conducted by the mobile device, then the POS device and mobile device are considered at the same location (step 320). The geographical location served by each MSC 424 (a "trust zone") may be useful in most circumstances for confirming that the mobile device and the POS device are at the same location, particularly when used in conjunction with scoring as described earlier. In other embodiments, the more specific information relating to BSC 418 or the network tower 412 (and its associated BTS) communicating with the mobile device may be provided by the MSC 424 to the HLR 430, and such specific location information may be accessed at the HLR for purposes of determining if the POS device is at the same location as the mobile device (step 320).

The authentication of a mobile device by a mobile service provider, e.g., when a mobile device moves between locations, is needed for various reasons, such as confirming that only an authorized subscriber is attempting to use subscription services, such as data services, rather than a third party that may have obtained the mobile subscriber identity (IMSI) in a surreptitious or fraudulent manner. The authentication of the mobile device by the mobile service provider is thus advantageously used, in embodiments of the present invention, to also verify that the authorized mobile device is at the same location as the POS device where a transaction is being conducted, thereby improving the operation and accuracy of authentication systems, and making it more difficult for fraudsters to conduct transactions with misappropriated mobile device identifiers.

Authentication of a mobile device by a mobile service provider as just described is well known to those skilled in the art. In its simplest form, a secret key and a ciphering algorithm are present at the mobile device on the SIM card and at an authentication system and HLR maintained by the mobile service provider. During authentication, the authentication system generates a random number that is sent to the mobile device, and both the mobile device and authentication system use the random number in conjunction with the secret key and the ciphering algorithm to generate a second encrypted number. The second encrypted number is returned from the mobile device to the authentication system, where it is compared to the second encrypted number generated at the authentication system. The secret key and ciphering algorithm for a specific mobile device may be stored, as noted earlier, at the HLR for that device and provided to the authentication system. Other authentication protocols are also known and could be used. One such authentication protocol is described in U.S. Pat. No. 6,745,029, "Method And Arrangement For Handling Network Specific Subscriber Data During Roaming By Use Of SIM Card Information Storage," issued Jun. 1, 2004 to Lauri Lahtinen et al., and another, more complex key agreement protocol is described in U.S. Pat. No. 9,088,408, "Key Agreement Using A Key Derivation Key," issued Jun. 21, 2015 to Matthew Campagna et al, both of which are hereby by incorporated by reference in their entirety.

While a detailed description of presently preferred embodiments of the invention has been given above, various alternatives, modifications, and equivalents will be apparent to those skilled in the art without varying from the spirit of the invention. Therefore, the above description should not be taken as limiting the scope of the invention, which is defined by the above description and the appended claims.

What is claimed is:

1. A method for authenticating a transaction conducted at a point of sale (POS) device by a customer, the method comprising:
   at a POS registry in a transaction authentication system, storing, in association with a POS ID corresponding to each of one or more POS devices, POS location data pertaining to the location of the corresponding POS device;
   at a PAN registry in the transaction authentication system, storing, in association with an account ID corresponding to each of one or more accounts, a mobile device ID identifying a mobile device of the customer;
   receiving, at the transaction authentication system, transaction data for a transaction conducted against a specified account at a specified POS device by the customer using the mobile device, the transaction data comprising a POS identifier for the specified POS device and an account ID for the specified account;
   with the received transaction data at the transaction authentication system, (1) accessing the POS registry for location data for the specified POS device, and (2) accessing the PAN registry to retrieve the mobile device ID associated with the mobile device of the customer;
   using the retrieved mobile device ID to determine current location data for the mobile device, by accessing real-time location information maintained by a mobile service provider that is generated within a mobile service network; and
   comparing the accessed location data for the specified POS device and the determined location data for the mobile device.

2. The method of claim 1, wherein the real-time location information maintained by a mobile service provider is maintained at a home location register (HLR) of the mobile service provider and is based on the location of the transaction authentication systems within the mobile service network with which the mobile device is communicating.

3. The method of claim 2, wherein the real-time location information maintained at the home location register of the mobile service provider is an identifier for a mobile switching center managing a coverage area in which the mobile device is located.

4. The method of claim 2, wherein the real-time location information maintained at the home location register of the mobile service provider is an identifier for a base transceiver station (BTS) through which the mobile device is communicating.

5. The method of claim 1, wherein the POS location data stored in the POS registry is based on information from past transactions for the corresponding POS device, including the location of mobile devices used for those past transactions.

6. The method of claim 1, wherein using the retrieved mobile device ID to determine the location data for the mobile device comprises:
   accessing a home location register (HLR) maintained by or for a mobile service provider providing mobile services to the mobile device, wherein the home location register stores location data corresponding to the mobile device ID for each of a plurality of mobile devices operating within the mobile service network of the mobile service provider; and
   using the retrieved mobile device ID to retrieve the stored location data for the mobile device.

7. The method of claim 6, wherein the location information at the home location register is stored when the mobile device has been authenticated to use the mobile service network.

8. The method of claim 1:
   wherein the POS location data is generated by:
   receiving transaction data for one or more past transactions conducted at corresponding one or more POS devices, including an identifier for a mobile device used for the one or more past transactions;
   determining the location of the mobile device used for the one or more past transactions;
   determining whether the one or more past transactions conducted at the corresponding POS device have been authenticated; and
   determining the location of the corresponding POS device based on the location of the mobile device used for the one or more past transactions that have been authenticated; and
   wherein storing POS location data pertaining to the location of the corresponding POS device comprises storing the determined location of the specified POS device as POS location data in the POS registry.

9. The method of claim 1, wherein the transaction is conducted using the mobile device as a presentation instrument.

10. The method of claim 1, wherein the transaction is conducted using a presentation instrument separate from the mobile device.

11. The method of claim 1, wherein the POS device location data is based at least in part on recent transactions conducted at the corresponding POS device by one or more mobile devices, where the recent transactions have been determined to be valid.

12. A system for authenticating a transaction conducted at a point of sale (POS) device by a customer having a mobile device, comprising:
   a POS registry storing POS location data in association with a POS ID corresponding to each of one or more POS devices, POS location data pertaining to the location of the corresponding POS device;
   a PAN registry storing a mobile device ID in association with each of a plurality of an account IDs, each mobile device ID used for accessing location data that is stored by a mobile service provider and that identifies locations corresponding to mobile device IDs;
   wherein, upon a transaction being conducted by the customer at the POS device, a POS device ID is received at the transaction authenticating system and used to access the POS registry to retrieve location data for a POS device corresponding to the received POS device ID, an account ID is received at the transaction authenticating system and used to access the PAN registry to retrieve a mobile device ID stored in association with the received account ID, and the retrieved mobile device ID is used to access real-time location information maintained by a mobile service provider that is generated within a mobile service network; and
   wherein the authentication of the transaction is evaluated based at least in part on a comparison of the retrieved location data from the POS registry and the accessed location data for the mobile device from the mobile service provider.

13. The system of claim 12, wherein the real-time location information maintained by a mobile service provider is maintained at a home location register (HLR) of the mobile service provider and is based on the location of systems for authenticating a transaction within the mobile service network with which the mobile device is communicating.

14. The system of claim 13, wherein the real-time location information maintained at the home location register of the mobile service provider is an identifier for a mobile switching center managing a coverage area in which the mobile device is located.

15. The system of claim 13, wherein the real-time location information maintained at the home location register of the mobile service provider is an identifier for a base transceiver station (BTS) through which the mobile device is communicating.

16. The system of claim 12, wherein the POS location data stored in the POS registry is based on information from past transactions for the corresponding POS device, including the location of mobile devices used for those past transactions.

17. The system of claim 12, wherein the retrieved mobile device ID is used to access real-time location information maintained by a mobile service provider by:
   accessing a home location register (HLR) maintained by or for a mobile service provider providing mobile services to the mobile device, wherein the home location register stores location data corresponding to the mobile device ID for each of a plurality of mobile devices operating within the mobile service network of the mobile service provider; and
   using the accessed mobile device ID to retrieve the stored location data for the mobile device.

18. The system of claim 17, wherein the location information at the home location register is stored when the mobile device has been authenticated to use in the mobile service network.

19. The system of claim 12:
   wherein the POS location data stored in the POS registry is generated by:
   receiving transaction data for one or more past transactions conducted at corresponding one or more POS devices, including an identifier for a mobile device used for the one or more past transactions;
   determining the location of the mobile device used for the one or more past transactions;

determining whether the one or more past transactions conducted at the corresponding POS device have been authenticated; and determining the location of the corresponding POS device based on the location of the mobile device used for the one or more past transactions that have been authenticated; and wherein POS location data is stored in the POS registry by storing the determined location of the corresponding POS device in the POS registry.

20. The system of claim 12, wherein the transaction is conducted using the mobile device as a presentation instrument.

21. The system of claim 12, wherein the transaction is conducted using a presentation instrument separate from the mobile device.

22. The system of claim 12, wherein the POS device location data is based at least in part on recent transactions conducted at a POS device by one or more mobile devices, where the recent transactions have been determined to be valid.

* * * * *